June 18, 1929. O. HALVORSEN ET AL Re. 17,327

PASS CASE

Original Filed May 29, 1924

INVENTORS:—
Olaf Halvorsen
William T. Leibels

BY
Alexander & Sawell
ATTORNEYS

Reissued June 18, 1929. Re. 17,327

UNITED STATES PATENT OFFICE.

OLAF HALVORSEN AND WILLIAM T. SEIBELS, OF CHICAGO, ILLINOIS, ASSIGNORS TO WILLIAM M. BLAIR, OF CHICAGO, ILLINOIS.

PASS CASE.

Original No. 1,542,124, dated June 16, 1925, Serial No. 716,556, filed May 29, 1924. Application for reissue filed January 19, 1927. Serial No. 162,188.

This invention relates to improvements in pass-cases and more particularly to foldable pocket cases especially designed for carrying passes, currency, identification cards and the like.

The object of the invention is to provide a case in which card or pass holding members are removably retained, thus permitting additional members to be added or removed at will.

A further object of the invention is to provide a novel means for removably securing the card or pass holding members within the case.

The preferred embodiment of the invention is disclosed in the accompanying drawings in which Figure 1 is a perspective view of the complete case with a single card holding element secured therein.

Figure 1:
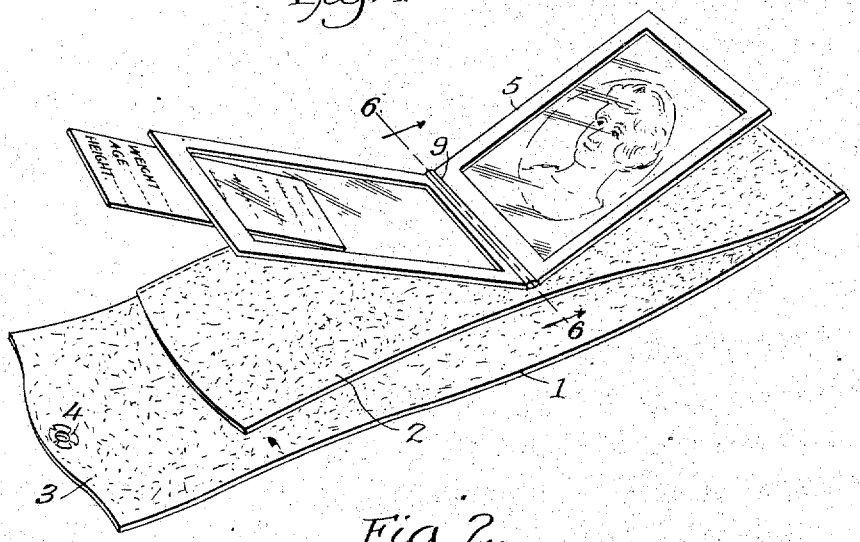
Figure 2:
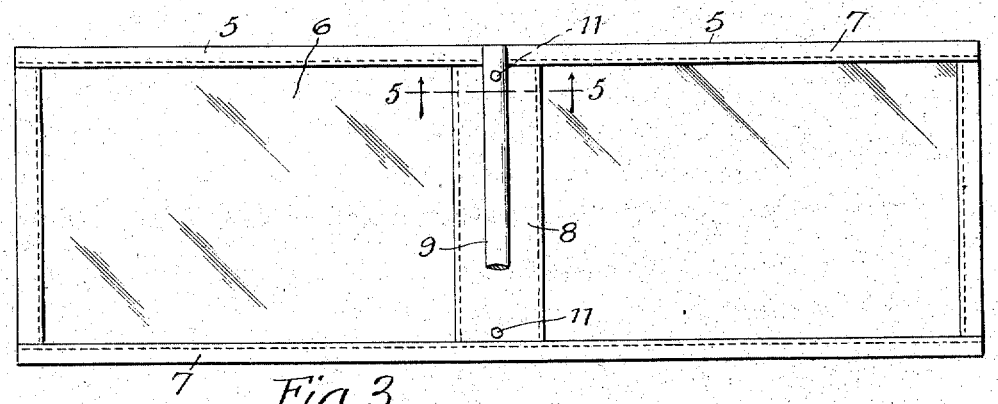
Figure 2 is a view in elevation of the card holding member and showing the manner in which the securing member is applied.
Figure 3:
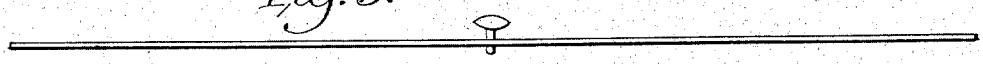
Figure 3 is a view in end elevation of the card holding member shown in Figure 2.
Figure 4:
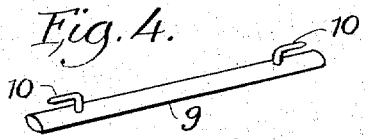
Figure 4 is a perspective view of the securing member.
Figure 5:
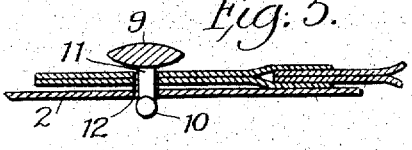
Figure 5 is an enlarged detailed view in section taken on line 5—5 of Figure 2.

In its preferred form, the case consists of a foldable cover of soft leather, made up of an outer ply 1 and an inner ply 2, stitched together along one side and one end edge. The outer ply includes an extended end portion 3 which forms a flap for securing the case in closed position by a suitable fastener 4. The cover is foldable lengthwise along a line midway between the ends, the flap 3 lapping over the ends of the case in the usual manner and fastened to the surface of the outer ply by the snap fastener 4.

A card holding member preferably consists of two hinged-together rectangular frames 5—5, each made up of two rectangular pieces of celluloid 6, bound together at their edges by strips 7 of a suitable fabric or other binding material which is stitched around the edges of the celluloid sheets so as to leave a slot at one edge for the removal and insertion of the cards. A transverse strip 8 of the same flexible material forms the hinge between the rectangular transparent frames or card holding sections 5—5.

As a means for securing the card holding element to the cover or case proper, a nickeled or brass bar is provided, which has pins 10—10 located near each end, said pins being bent at right angles intermediate their ends so as to form relatively short shanks extending at right angles to the bar and somewhat longer portions extending parallel to and toward the opposite ends.

Figure 6:
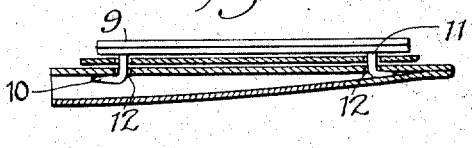
Figure 6 is an enlarged sectional view taken on line 6—6 of Figure 1.

The hinged forming portion 8 of the card holding member 5 is perforated as at 11—11 and the inner cover strip 2 is similarly perforated as at 12. Thus, to remove or insert the card holding element the pins 10—10 are passed through the perforation and occupy the position shown in Figure 6. The shanks of the pins 10 are sufficiently long to accommodate one or more of the card holding elements, thus the same can be added as occasion demands.

As clearly shown in Figure 1, a single card or picture can be inserted in each side or section of the card holding member, and if desired, two cards or passes may be inserted in each section with the printed matter on each facing outwardly, so that the maximum number of cards may be inserted and carried in the case.

The use of removable card holding members permits of expansion; a further advantage is derived, namely, that it permits their renewal whenever the same becomes worn or otherwise damaged. The necessity for renewal is particularly desirable in cases of this character, for the reason that while celluloid has been found to be the only practical material to be used for the purpose, its surface becomes readily scratched and roughened within a relatively short space of time and as a result loses its transparency. Therefore, with this construction these card holding elements can be readily replaced without the necessity of purchasing an entirely new case.

Having described a preferred embodiment of the invention, we claim:

1. A pass-case comprising a foldable cover of pliable material, a card holding member, consisting of frames of transparent material joined together by a section of flexible material, and a bar adapted to extend transversely of said card holding member and provided with fastening members adapted to pass through the flexible section thereof and said cover.

2. A pass-case comprising a foldable cover of pliable material, a card holding member, consisting of frames of transparent material joined together by a section of flexible material, and a bar adapted to extend transversely of said card holding member and provided with pins adapted to pass through the flexible section thereof and said cover.

3. A pass-case comprising a foldable cover, consisting of an outer and an inner ply of flexible material, a card holding section consisting of flexibly connected frames of transparent material, and a bar adapted to extend transversely of said card holding section, and provided with pins adapted to be inserted through registering perforations in the flexible portion of said card holding section and the inner ply of said cover.

4. In a foldable pass case having a fold therein, pairs of card holding members hingedly connected together, and means for detachably attaching the hinge portions of one or more pairs to the pass case at the fold thereof, said means comprising a bar adapted to overlie the hinged portions of the pairs of card holding members, and members adapted to be inserted through registering perforations in the pass case and hinged portions and engaging the bar.

5. A pass case comprising a foldable cover consisting of an outer and an inner ply having a fold therein, pairs of card holding members joined together by strips of flexible material, and means for detachably attaching the strips of one or more superimposed pairs to the pass case at the fold thereof.

6. In a pass case as set forth in claim 5, said means comprising a bar adapted to overlie said strips and members on the bar adapted to pass through registering perforations in the superimposed strips and the inner ply of the cover.

7. In a pass case, a foldable cover of flexible material comprising an outer ply and an inner ply, means for securing the inner ply to the outer ply along one edge and one end thereof, pairs of card holding members comprising sheets of transparent material adapted to be secured together along the edges thereof by suitable strips of flexible material and adapted to have adjoining ends thereof connected together by a strip of flexible material whereby to provide an open space therebetween at the opposite ends thereof, and means for detachably securing said card holders to said inner ply of said cover member.

8. In a pass case, a cover of flexible material comprising an inner and an outer ply, means for securing the inner ply to the outer ply along one edge and one end thereof, card holding means comprising sheets of transparent material adapted to be disposed in cooperating relation, means for connecting coextensive edges of said card holders, a flexible strip for connecting adjoining ends of said card holding members, means for securing pairs of said card holding means to said cover in superimposed relation including a bar adapted to extend across the uppermost of said flexible sections, and hook members adapted to be inserted through aligned openings in said flexible strips and said inner ply.

In testimony that we claim the foregoing as our own we affix our signatures.

OLAF HALVORSEN.
WILLIAM T. SEIBELS.